United States Patent [19]
Fishback et al.

[11] Patent Number: 6,077,926
[45] Date of Patent: *Jun. 20, 2000

[54] PHYSICAL PROPERTIES OF SEALANTS USING POLYOLS WITH REDUCED UNSATURATION

[75] Inventors: Thomas L. Fishback, Gibraltar; Curtis J. Reichel, Southgate; Gladys M. Avilés, Canton, all of Mich.

[73] Assignee: BASF Corporation, Mt. Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,409

[22] Filed: Jul. 23, 1997

Related U.S. Application Data

[63] Continuation of application No. 08/388,919, Feb. 15, 1995, abandoned.

[51] Int. Cl.[7] .......................... C08G 18/30; C08G 18/32; C08G 18/48
[52] U.S. Cl. ............................................... 528/76; 528/409
[58] Field of Search ........................................ 528/76, 409

[56] References Cited

U.S. PATENT DOCUMENTS

| | | | |
|---|---|---|---|
| 4,985,491 | 1/1991 | Reisch | 524/875 |
| 5,010,187 | 4/1991 | Heuvelsland | 521/159 |
| 5,070,125 | 12/1991 | Heuvelsland | 521/167 |
| 5,096,993 | 3/1992 | Smith et al. | 528/76 |
| 5,106,874 | 4/1992 | Porter et al. | 528/64 |
| 5,124,425 | 6/1992 | Higuchi et al. | 528/59 |
| 5,374,705 | 12/1994 | Laycock et al. | 528/77 |
| 5,468,840 | 11/1995 | Tsutsui et al. | 528/408 |

FOREIGN PATENT DOCUMENTS

| | | |
|---|---|---|
| 573206 | 12/1993 | European Pat. Off. . |
| 6-179746 | 6/1994 | Japan . |

OTHER PUBLICATIONS

Blysma et al., "Improvement of Properties of Urethane Elastomers by Removal of Terminal Unsaturation in Poly(oxypropylene)Diols", Ind. Eng. Chem. Prod. Res. Develop, vol. 7, pp. 234–238, Aug. 1968.

J. Arceneaux et al., "The Effect of Monohydroxy Polyether Polyols on the Processing, Reactivity, and Physical Properties Performance of Flexible Slabstock Foam System", Journal of Elastomers and Plastics, vol. 14, pp. 63–73, Jan. 1982.

*Primary Examiner*—Frederick Krass
*Attorney, Agent, or Firm*—Fernando A. Borrego

[57] ABSTRACT

There is now provided a sealant and elastomer made with a polyol having an unsaturation level of 0.04 to 0.07, manufactured with a basic salt of an alkaline earth metal or a basic salt of cesium, such as cesium hydroxide. The elastomers and sealants made therefrom exhibit an increasing modulus of elasticity when strained from 100 percent elongation to 300 percent elongation. The reduced unsaturation polyols are simple and inexpensive to make while imparting good physical properties to the sealants and elastomers.

9 Claims, No Drawings ured level of 0.04 or less successfully increased the elongation percent, ultimate tensile strength, and the modulus of elasticity of the polyurethane elastomers and sealants prepared therewith.

PHYSICAL PROPERTIES OF SEALANTS USING POLYOLS WITH REDUCED UNSATURATION

This a continuation of application Ser. No. 08/388,919 filed Feb. 15, 1995, now abandoned.

FIELD OF THE INVENTION

The present invention relates to a process for the manufacture of sealants and elastomers using a polyol with reduced unsaturation; more specifically, the polyols employed in the present invention have an unsaturation level ranging from 0.04 to 0.07 and are manufactured using a basic salt of an alkaline earth metal or a basic salt of cesium as a catalyst, thereby imparting several improved physical properties to sealants and elastomers.

BACKGROUND OF THE INVENTION

It is well known that polyurethane elastomers and sealants can be manufactured by reacting an organic polyisocyanate with a high molecular weight polyol, generally in a range of 2,000 MW to 20,000 MW (equivalent weights of generally 900 to 10,000). Polyoxypropylene polyols prepared with alkali metal hydroxide catalysts, such as NaOH or KOH, begin to show a high degree of unsaturation as the molecular weight of the polyol increases. Polyoxypropylene polyether polyols generally begin forming unsaturation groups when the hydroxyl number of the polyol is about 60 or less, or the equivalent weight of the compound is about 900 or more. When using the conventional alkali metal hydroxide catalyst for the preparation or high molecular weight polyoxypropylene polyether polyols, the degree of unsaturation is generally 0.10 meq/g of polyol or more.

A polyol having a high degree of unsaturation means that a significant number of monools are present among the polyols. A monool undergoing reaction terminates further chain growth; therefore, the properties of the polyurethane sealant or elastomer suffer. In particular, the tensile strength at break, the modulus of elasticity, the elongation, hardness, wear resistance, etc. begin to degrade.

In response to the above-mentioned problems, it has been proposed to lower the unsaturation of the polyols using double metal cyanide catalysts. For example, U.S. Pat. Nos. 5,096,993; 5,185,420; 4,985,491 to Olin Corporation; and WO 92/06139 disclose a preparation of polyether polyols having unsaturation levels of less than 0.04 meq/g prepared by double metal cyanide catalysts. The object of the inventions disclosed in these patents was to increase the physical properties of the elastomer, specifically, the tensile strength, including the modulus of elasticity and elongation, as much as possible. In each of the examples disclosed in these patents, polyether polyols prepared using double metal cyanide catalysts were reacted with isocyanates to produce both soft and hard elastomers. The polyols having an unsat- Japanese patent application Kokai No. 2-263819 also teaches a preparation of polyurethane elastomers using polyols having hydroxyl numbers of 34 to 60 and a total degree of unsaturation of 0.03 meq/g or less. The catalysts proposed for the preparation of such low unsaturation polyols were diethyl zinc, iron chloride, metallic polyphyrin, and metallic cyanide complexes. Likewise, JP patent application Kokai No. 5-295073 and 2-263818 each propose employing a polyether polyol having a degree of unsaturation of 0.07 or less, the particular degree of unsaturation varying with the hydroxyl number of the polyol, also prepared using the same aforementioned catalysts. In each of the working examples of these Japanese references, polyols having unsaturation levels of less than about 0.03 were employed in the preparation of elastomers having high elongations, e.g., 700 percent or more; high ultimate tensile strengths of 1,000 psi or more; and a high modulus of elasticity (tensile strength at 100 percent elongation) of 500 psi or more.

While low unsaturation polyols prepared by double metal cyanide catalysts impart improved properties to polyurethane elastomers, such catalysts are not currently commercially available and are both time consuming and expensive to make. Further, double metal cyanide catalysts, if left in the polyol mixture, act as weak Lewis acids and affect the reactivity of the polyurethane foaming mixture. Other catalysts such as iron chloride and $BF_4$ require temperatures generally of about 100° C. to catalyze the reaction between the alkylene oxide and the initiator in the formation of the polyol. Furthermore, iron chloride tends to color the polyol. Thus, it would be desirable to employ a catalyst that can be used to catalyze the alkene oxide/initiator reaction at low temperatures, which can be removed from the polyol mixture without difficulty, or left in the polyol and neutralized, and which is an inexpensive alternative to double metal cyanide catalysts.

As mentioned above, the low unsaturation polyols markedly improve all physical properties of the polyurethane elastomers and sealants, including the modulus of elasticity. However, it would be desirable to make a polyurethane sealant or elastomer having a relatively low modulus of elasticity so that the material can expand or contract with changes of temperature.

We have also found that it would be highly desirable to manufacture a sealant or an elastomer which exhibits an increasing modulus of elasticity when strained between 100% and 300%. The toughness of such a sealant or elastomer would increase as it expands under adverse weather of mechanical conditions. We have found that sealants made with polyols manufactured using a double metal cyanide catalysts at unsaturation levels of less than 0.04 can exhibit a decreasing modulus of elasticity when subjected to strains at 100% and 300%. While none of the above described publications address this problem or suggest the desirability of this feature, EP 0573206 does advocate the use of low unsaturation polyols in order to decrease the modulus of elasticity when strained at 100% and 200%. Contrary to the objectives of EP 0573206, we desire to use a polyol in one of the embodiments which will increase the modulus of elasticity of a sealant when strained between 100% and 300%, while simultaneously imparting to the sealant a high elongation and satisfactory tensile strength at break.

SUMMARY OF THE INVENTION

It would be desirable to manufacture a high equivalent weight polyoxyalkylene polyether polyol having reduced unsaturation, which is simple and inexpensive to manufacture, employing a catalyst which may be easily removed or neutralized. Such reduced unsaturation polyols should impart a relatively low modulus of elasticity while simultaneously maintaining good elongation and ultimate tensile strength to a polyurethane elastomer or sealant. In another embodiment, it would also be desirable to make an elastomer which exhibits an increasing modulus of elasticity when strained from 100% elongation to 300% elongation.

There is now provided a polyol, a prepolymer, an elastomer, and a process for the manufacture of each, wherein the polyol is a polyalkylene polyether polyol having a degree of unsaturation ranging from 0.04 to 0.07 meq/g of polyol manufactured by reacting propylene oxide onto an initiator molecule in the presence of a basic salt of cesium and/or a basic salt of a Group II alkaline earth metal. In one embodiment, the reduced unsaturation polyols used in the invention have an equivalent weight of at least 900, and are initiated with polyhydroxyl functional compounds optimally having a hydroxyl functionality of 2 to 3. The polyols may be used to prepare elastomers and sealants by the one-shot process or the prepolymer process.

The invention also features polyurethane elastomers having a lower tensile strength at 100% elongation than an elastomer prepared with a polyol having a similar equivalent weight and a lower degree of ethylenic unsaturation using double metal cyanide catalysts.

In yet another embodiment of the invention, there is also surprisingly provided an elastomer which exhibits an increasing modulus of elasticity when strained from 100% elongation to 300% elongation, made with the polyether polyol described herein. Further, in a more preferred embodiment, the ratio of modulus of elasticity at 300% elongation to the modulus of elasticity at 100% elongation of an elastomer or sealant is at least 1.2. This positive ratio is larger than a similar elastomer or sealant prepared with a similar equivalent weight polyol having a lower degree of ethylenic unsaturation using a double metal cyanide catalyst or a polyol having the same degree of unsaturation using catalysts other than the catalysts used to prepare the polyol of the invention.

DETAILED DESCRIPTION OF THE INVENTION

The term "elastomer" as used herein and in the claims includes sealants.

The term "molecular weight" as used herein and in the claims refers to the number average molecular weight.

The term "basic salt" as used herein and in the claims means a molecular or ionic substance that can combine with a proton to form a new compound, and in solution, the basic salts have a pH ranging from 7.1 to 14.

The polyether polyol of the invention has a degree of ethylenic unsaturation ranging from 0.04 to 0.07 meq/g of polyol, preferably from 0.045 to 0.06 meq/g of polyol. The equivalent weight of the polyether polyol is at least 900, preferably from 1000 to 10,000, more preferably from 1,500 to 5,000, most preferably from 1500 to 2750. The hydroxyl number of the polyether polyols is generally less than 60 meq/g KOH, preferably grow 20 to 40. The ultimate functionality of the polyether polyols will depend upon the degree of unsaturation, the functionality of the initiator molecules, and the desired application. In general, the preferred ultimate functionality of the polyether polyols range from 1.85 to 3.0.

The low unsaturation polyether polyols are prepared by reacting an initiator compound with propylene oxide in the presence of a basic salt of cesium or a basic salt of a Group II alkaline earth metal as a catalyst.

The initiator compounds are preferably polyhydroxyl compounds having a hydroxyl functionality ranging from 2 to 3. Specific examples of initiator compounds include ethylene glycol, diethylene glycol, propylene glycol, dipropylene glycol, butanediol, polyoxypropylene polyols having an equivalent weight of 500 or less, and trihydroxyl compounds such as glycerine and trimethyololpropane. Higher functional initiator molecules may be admixed, but we prefer that the average hydroxyl functionality is within the range of 2–3.

The polyether polyols of the invention contain polyoxypropylene blocks. It is preferred that sufficient propylene oxide is added to the initiator molecule to produce at least a 900 equivalent weight block of oxypropylene units, more preferably at least a 1500 equivalent weight block of oxypropylene units. The polyoxypropylene blocks may or may not appear as a segment bonded directly to the initiator molecule. The phrase "reacting propylene oxide with an initiator molecule" is meant to include both a direct bond of propylene oxide onto an initiator molecule to form an innermost block of polyoxypropylene, or an indirect bond with the initiator molecule via other polymerized alkylene oxides. For example, ethylene oxide may first be added to the initiator molecule followed by propylene oxide addition. It is preferred, however, that the block of oxypropylene units are directly linked to the initiator molecule.

Also, ethylene oxide may be either added along with the propylene oxide to form a heteric molecule or added at the conclusion of the propylene oxide addition to form a terminal block. In one embodiment, the polyether polyol contains 15 wt. % or less of polyoxyethylene groups based on the weight of all polyoxyalkylene groups, and more preferably, the polyether polyol is terminated with polyoxyethylene groups. In another embodiment, the reduced unsaturation polyols possess no polyoxyethylene groups or primary hydroxyl group termination.

The polyol of the invention must be prepared in the presence of a basic salt of cesium and/or a basic salt of a Group II alkaline earth metal. Preferred are the hydroxide anions of the aforementioned metals, and more preferred is cesium hydroxide. A specific example of a Group II metal hydroxide is calcium hydroxide.

To manufacture low unsaturation polyols using these catalysts, the following procedure may be employed, using CsOH as a non-limiting illustration: an initiator molecule such as a diol, triol, or a mixture thereof, along with a solution of CsOH, may be charged to an autoclave. The molar ratio of CsOH to the initiator(s) and charged oxides can range from 0.05 to 1.0 mole percent, preferably from 0.1 to 0.4 mole percent. The initiator and CsOH are agitated while purging the autoclave with nitrogen. Any water present should be stripped from the ingredients at reduced pressures, such as <10 mmHg, and elevated temperatures. Subsequently, propylene oxide may be charged and reacted with the initiator in the presence of CsOH initially at temperatures ranging from 82° C. to 105° C. The rate of propylene oxide addition can vary from 4 to 20 hours, depending upon the desired molecular weight of the polyol. The rate of addition may optionally vary during the course of the charging phase such that the alkylene oxide may be quickly charged at the beginning until a certain equivalent weight, i.e., 700 to 900, is obtained, after which propylene oxide may be added at a slower rate. Once all the propylene oxide, has been added, the ingredients can be reacted for one (1) to eight (8) hours to ensure complete reaction of the residual oxides that may be present in the reaction chamber. At this point, additional oxides such as ethylene oxide may be added as a terminal cap on the polyol. The reaction ingredients are subsequently cooled to 40° C. to 70° C. at reduced pressures and discharged.

The cesium alkoxide residuals may be removed by treating the polyol with an absorbent, such as a silicate salt like magnesium silicate, thereby forming a salt with the cesium cation. The polyol containing the salt may then be filter pressed to remove the salts leaving behind a purified reduced unsaturation polyol. The polyol may then be subsequently stabilized with stabilizers well known in the art. Alternatively, the cesium residuals may be left in the polyol mixture and neutralized using an acid such as phosphoric acid.

When employing the prepolymer method for preparing the polyurethane elastomers of the invention, the low unsaturation polyols are reacted with an organic polyisocyanate to form a prepolymer having a free NCO content of the isocyanate prepolymer can range from 0.1 to 15 weight percent. If the prepolymer is moisture cured, it preferably has a free NCO content of from 0.1 to 4 wt. %. The polyether polyol may reacted be with the isocyanate at an equivalent ratio of 1:15 to about 1:1.1. A common urethane tertiary amine catalyst may be employed to prepare the prepolymer in amounts ranging from about 0.01 to 3 percent by weight of the prepolymer.

In the one-shot method, the low unsaturation polyol may be reacted with an organic polyisocyanate at an isocyanate index of 95 to 130, preferably from 100 to 110.

The low unsaturation polyols used in the invention can be mixed with other conventional polyols having molecular weights below 2000, or minor amounts of high molecular weight polyols having ethylenic unsaturation values outside the range of 0.04 to 0.07 meq/g. Preferably, less than 20 weight percent of polyols having an unsaturation level higher than 0.07 should be admixed with the polyether polyols used in the present invention. The low molecular weight polyols (less than 1500 MW) include well-known chain extenders such as ethylene glycol, butanediol, hexanediol, propylene glycol, Bisphenol A, or polyalkylene oxide polyols. Chain extenders can also include glycerine, trimethylolpropane, or propoxylated adducts of glycerine or trimethylol propane or amines like diethyltoluenediamine, ethylenediamine, triisopropylamine, methylenebis (orthochloroaniline), and the like. If the prepolymer method is employed, the prepolymer can be cured with either moisture or extended with chain extenders, such as those mentioned above.

The usual organic polyisocyanates can be employed in the invention. The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

The usual catalysts can be used to cure the reaction or promote formation of polyurethane linkages. Catalysts may be employed which greatly accelerate the reaction of the compounds containing hydroxyl groups and with the modified or unmodified polyisocyanates. Examples of suitable compounds are cure catalysts which also function to shorten tack time and promote green strength. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an -$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, dibutyltin dichloride, and dioctyltin dioxide.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

Typical stabilizers, reinforcing agents, fillers, plasticizers, pigments, sagging preventors, and adhesion promoters can be added as desired. These include clay, silica, fumed silica, carbon black, talc, phthalocyanine blue or green, titanium oxide, ultraviolet absorbers, magnesium carbonate, calcium carbonate, chlorinated paraffins, dioctyl adipate, aluminum stearate, calcium stearate, zinc stearate, and the like.

In one embodiment of the invention, the polyurethane elastomers of the invention have an elongation of 600 percent or more as measured by ASTM D412, exhibit a tensile strength at break of at least 40 psi as measured by ASTM D 412, and exhibit a modulus of elasticity at 100 percent strain of less than 20 psi and at 300 percent strain of less than 40 psi as measured by ASTM standard D412. This low modulus of elasticity along with the good elongations and satisfactory tensile strengths at break are attained when employing a polyol prepared with the basic cesium or Group II alkaline earth metal catalysts to produce a degree of unsaturation ranging from 0.04 to 0.07.

In another embodiment of the invention, the elastomer prepared from the polyether polyols described herein have a modulus of elasticity which increases when strained from 100% elongation to 300% elongation. By the word "increases" is meant that the as the elastomer is strained from an initial 100% elongation to 300% elongation, the modulus of elasticity does not drop below the initial modulus of elasticity value as measured at 100% by more than 5%, and the final modulus of elasticity measured as 300% elongation is higher than the modulus measured at 100% elongation.

In another embodiment of the invention, the elastomer exhibits a ratio of a modulus of elasticity at 300% elongation to a modulus of elasticity at 100% elongation of at least 1.2, preferably at least 1.4, more preferably at least 1.5. This is desirable in some applications to retain the toughness of the elastomer as it undergoes elongation strains while simultaneously being ductile enough to allow the elastomer to stretch to at least 600% elongation.

EXAMPLE POLYOL 1

In this example, a low unsaturation polyether polyol was prepared using CsOH as the catalyst. 513.1 grams of a 740 molecular weight propylene oxide adduct of trimethylolpropane were charged to a clean, dry steel autoclave, along with 73.5 grams of a 50 wt. % aqueous CsOH solution. After initiating agitation, the autoclave was purged three (3) times with nitrogen, after which the reactor was heated to 105° C. while slowly evacuating to less than 10 mm/Hg. Water was stripped from the contents of the reactor at this temperature and pressure for two (2) hours. Vacuum was subsequently relieved to a 0 psig using nitrogen as a pad. The ingredients in the autoclave were cooled to 90.6° C., after which 4,818.1 grams of propylene oxide were added for 18 hours, allowing the temperature to rise from 90.6° C. to 110° C. The pressure during the charging phase of the propylene oxide was kept to 90 psig or less. After completion of the propylene oxide charging phase, the contents of the reactor were reacted for an additional four and a half hours at 110° C. Subsequently, the autoclave was evacuated to 10 mm/Hg and pressurized to 34 psig with nitrogen. 268.8 grams of ethylene oxide were then added at 110° C., under 90 psig for a one-hour period. Subsequently, the contents in the autoclave were reacted for an additional hour, evacuated to 10 mm/Hg for thirty (30) minutes, cooled to 60° C., and then discharged to a nitrogen-flushed container.

The polyol was treated with a three percent Magnesol® absorber and 1.5 percent water at 95° C. for one and a half hours. After formation of the salt, the polyol mixture was recycled through a filter press until the polyol was haze free. The polyol mixture was subsequently stripped at 100° C. at less than 10 mm/Hg for one hour and then cooled to 60° C.

The resulting polyol product had an OH number of 24.5 mg KOH/g of polyol, an ethylenic unsaturation of 0.051 Meq KOH/g polyol, a water content of 0.01 weight percent, an acid number of 0.006, a molecular weight of about 6,869, and an equivalent weight of about 2200. The polyol contained 4.8 wt. % of a terminal polyoxyethylene block, based on the weight of the total amount of propylene oxide and ethylene oxide units.

COMPARATIVE EXAMPLE POLYOL 2

In this example, Polyol 2 which is a trimethylolpropane initiated propylene oxide ethylene oxide adduct having about 4.8 wt. % of a polyoxyethylene cap, a degree of ethylenic unsaturation of 0.101, and an OH number of 26.1, was treated with a Dowex® 50X8-100 ion exchange resin treated with mercuric acetate to reduce the unsaturation of the Polyol 2, according to the procedure described in U.S. Pat. No. 3,271,462, incorporated herein by reference.

The ion exchange resin was prepared as follows. To a 2000 ml Erlenmeyer flask was added 1000 grams of distilled water followed by 87.5 grams of mercuric acetate. The two ingredients were mixed until homogenous. Subsequently, 500 grams of the Dowex® 50X8-100 resin were added and mixed in the flask for one and a half hours. The contents of the flask were filtered and washed until no mercury could be detected using a mercury detection paper. The resin was dried in a vacuum desiccator at room temperature under vacuum for 40 hours.

To a 5000 ml Erlenmeyer flask was added 200 grams water, 200 grams of the activated ion exchange resin, and 2000 grams of Polyol 2 having an OH number of 26.1 and a degree of ethylenic unsaturation of 0.101. To a second 5000 ml Erlenmeyer flask was also added 186 grams of water, 186 grams of activated ion exchange resin, and 1855 grams of Polyol 2. Each of the reactors were heated to 50° C. under a nitrogen pad and stirred at 500 rpm. While stirring for four (4) hours, the temperature was kept at 50° C. Subsequently, the reaction mixture was cooled to room temperature and left overnight under a nitrogen pad. The next day, the reaction mixture was warmed to 50° C. and filtered using a pressure filter. The reaction mixture was again left overnight under a nitrogen pad, and the next day was stripped at 110° C. for one (1) hour. To a five-liter flask was added 2300 grams of the polyols formed in the first two Erlenmeyer flask reactors. Analysis revealed that Polyol 2 had an OH number of about 27.5, and unsaturation level of 0.046, an acid number of 0.049, and a water content of 0.048.

Because the acid number was high, Polyol 2 was again treated with basic alumina stirred with the polyol under a nitrogen pad for one (1) hour. The alumina was filtered out using a filter pressure system, and the polyol was stripped at 110° C. and 0.3 mm/Hg for one (1) hour. The product had a hazy appearance; therefore, it was refiltered. Final analysis showed that the product had an OH number of 27.4, an acid number of 0.006, and an unsaturation level of 0.05, and 0.03% water.

COMPARATIVE EXAMPLE POLYOL 3

In this example, a low unsaturation polyol was prepared using a zinc cyanide catalyst. 424.6 grams of trimethylolpropane, 31.0 grams of $Zn_3[Co(CN)_6]_2$, and 141.5 grams of tetrahydrofuran (THF) were charged to a clean, vacuum-dried, nitrogen-filled, two-gallon autoclave. The autoclave was sealed, and agitation was initiated. The autoclave was purged three (3) times with nitrogen, after which it was heated to 90° C. and stirred for 15 minutes before addition of propylene oxide. A total of 2,202.9 grams of propylene oxide were added by the following procedure: propylene oxide was added slowly until the pressure of the vessel reached 30 psig, after which addition ceased until a fast pressure drop to 10 psig and a temperature increase was detected. The remaining propylene oxide was added at 90° C. and less than 30 psig. After addition of all the propylene oxide, the contents of the reactor were reacted for three (3) hours at 90° C., after which THF was stripped from the polyol at 90° C. in 10 mm/Hg for 15 minutes. The reaction polyol mixture was cooled to 40° C., and 2,108 grams of the polyol were discharged from the autoclave into a nitrogen-flushed container. The remaining polyol mixture was kept in the autoclave for reaction in the next step. About 550.5 grams of the polyol was kept back in the reactor.

The polyol made in the above procedure is an intermediate polyol of low molecular weight prepared using the $Zn_3[Co(CN)_6]_2$ catalyst. The autoclave was subsequently sealed again, agitation was initiated, and the autoclave was again purged three (3) times with nitrogen. The autoclave was heated to 90° C., after which the total of 3,614.3 grams of propylene oxide were added according to the following procedure: the propylene oxide was added slowly until the pressure in the autoclave reached 30 psig, then further addition was discontinued until a fast pressure drop to 10 psig and a temperature rise in the autoclave was detected. The remaining propylene oxide was added at 90° C. and less than 30 psig. At the conclusion of the propylene oxide charging phase, the contents of the reactor were reacted at 90° C. for three (3) hours; and excess propylene oxide was then stripped out at 90° C. in 10 mm/Hg for 15 minutes. The vacuum was then relieved to 0 psig, and the contents of the reactor were cooled to 70° C. after which 31.5 grams of a 45 percent KOH solution were added. The autoclave was again sealed and purged three (3) times with nitrogen, heated to 110° C., and then slowly evacuated to less than 10 mm/Hg. The contents of the reaction vessel were batch stripped at 110° C. and less than 10 mm/Hg for one (1) hour. The autoclave was then pressurized to 34 psig with nitrogen, after which 216 grams of ethylene oxide was charged at 110° C. and less than 90 psig within two (2) hours. At the conclusion of the ethylene oxide charging phase, the contents of the reaction vessel were reacted at a constant pressure for three (3) hours. Subsequently, the autoclave was evacuated at 10 mm/Hg for thirty (30) minutes, cooled to 60° C., and the contents were discharged to a nitrogen-flushed container.

To remove the $Zn_3[Co(CN)_6]_2$ catalyst, the polyol was treated with three percent Magnesol® absorber and 1.5 percent CELITE filter aid at 100° C. for one (1) hour. The polyol was then recycled through a filter press until the product was haze-free. Water was stripped from the polyol at 110° C. in less than 10 mm/Hg for one (1) hour and later cooled to 60° C. Analysis revealed that the product had an OH number of about 26.6, an unsaturation level of 0.02, a water content of 0.012 weight percent, and an acid number of 0.015.

PREPOLYMER PREPARATION

A. Prepolymer 1

To 87 grams of toluene diisocyanate, having a free NCO content of 48.1 percent, warmed to 40° C., was added a mixture of two polyols. The polyol mixture consisted of 568 grams of the low unsaturation polyol prepared in Example Polyol 1 by CsOH having a molecular weight of about 6,869 and a degree of unsaturation of 0.051; and 249 grams of Polyol A, which is a propylene oxide adduct of propylene glycol having an OH number of 56.1 and a degree of unsaturation of 0.03. The temperature of the polyol mixture was about 22° C. when added to the toluene diisocyanate. The contents were stirred at 115 rpm, and the polyol mixture was added over a period of two (2) hours. At the completion of the addition, the contents were reacted for one (1) additional hour at 80° C. and subsequently cooled down to 25° C. The prepared Prepolymer No. 1 had a free NCO content of 2.5 percent.

B. Comparative Prepolymer 2

The same procedure used to prepare Prepolymer No. 1 was also used to prepare Prepolymer No. 2. In the preparation of the Prepolymer No. 2, however, 508 grams of Comparative Example Polyol No. 2 (which used mercuric acetate treated resin) was used in place of CsOH catalyzed Polyol No. 1. The addition time of the polyol mixture to TDI was 65 minutes after which the reaction mixture was heated at 80° C. for one (1) hour under stirring at 125 rpm. Comparative Prepolymer No. 2 had a free NCO content of 2.71.

C. Comparative Prepolymer 3

The same procedure as in Prepolymer No. 1 was used to prepare Comparative Prepolymer No. 3, except that 523 grams of Comparative Polyol 3 using the $Zn_3[Co(CN)_6]_2$ catalyst was used in place of Polyol No. 1 prepared with CsOH. The polyol mixture was added over a period of 62 minutes after which the reaction contents were heated at 80° C. for a period of one (1) hour. The Comparative Prepolymer No. 3 had a free NCO content of 2.68 percent.

SEALANT WORKING EXAMPLES

The following ingredients were used to make the sealants:

POLYOL B is a propylene oxide adduct of propylene glycol having an OH number of about 107 and an unsaturation value of 0.02.

TALC is magnesium silicate.

DABCO® DC-200 is a defoamer commercially available from Air Products.

DABCO® T-12 is dibutyltin dilaurate, commercially available from Air Products Corporation.

The ingredients listed in Table I were mixed and reacted in the stated amounts. The polyol ingredients were mixed together at 750 rpm for about 10 seconds, after which they were reacted with the stated amounts of Prepolymers 1, 2, and 3.

The physical properties of the sealant samples are reported in Table II.

TABLE I

| INGREDIENTS | SEALANT 1 | SEALANT 2 | SEALANT 3 |
| --- | --- | --- | --- |
| POLYOL B | 52.4 | 52.4 | 52.4 |
| TALC | 57.2 | 53.8 | 53.8 |
| DABCO ® DC-200 | 0.3 | 0.1 | 0.3 |
| DABCO ® T-12 | 0.5 | 0.5 | 0.5 |
| PREPOLYMER 1 | 176.4 | — | — |
| COMPARATIVE PREPOLYMER 2 | — | 162.7 | — |
| COMPARATIVE PREPOLYMER 3 | — | — | 162.7 |
| INDEX | 105 | 105 | 105 |

TABLE II

|  | SEALANT 1 | SEALANT 1' | SEALANT 2 | SEALANT 2' | SEALANT 3 | SEALANT 3' |
| --- | --- | --- | --- | --- | --- | --- |
| CURE TIME, HOURS | 18 | 4 | 18 | 4 | 18 | 4 |
| TEMPERATURE (C.) | ROOM TEMPERATURE | 70#C. | ROOM TEMPERATURE | 70#C. | ROOM TEMPERATURE | 70#C. |
| DEMOLD (MIN.) SAMPLE SIZE | 18 | 18 | 18 | 18 | 18 | 18 |

TABLE II-continued

|  | SEALANT 1 | SEALANT 1' | SEALANT 2 | SEALANT 2' | SEALANT 3 | SEALANT 3' |
|---|---|---|---|---|---|---|
| THICKNESS | 5/8" | 5/8" | 5/8" | 5/8" | 5/8" | 5/8" |
| HEIGHT | 4.4 | 4.7 | 4.5 | 4.5 | 4.05 | — |
| WEIGHT | 418 | 442 | 427 | 435 | 389.2 | — |
| PCF | 72.4 | 71.7 | 72.3 | 73.7 | 73.2 | — |
| TENSILE STRESS AT BREAK (psi) | 54.0 | 47.4 | 9.7 | 15.4 | 118.9 | 100.2 |
| TENSILE STRESS AT 100 PERCENT | 18.2 | 14.7 | 6.7 | 8.2 | 24.0 | 54.0 |
| TENSILE STRESS AT 300 PERCENT | 30.9 | 24.5 | 6.3 | 9.0 | 17.4 | 41.8 |
| 300 PERCENT/100 PERCENT RATIO | 1.7 | 1.67 | 0.94 | 1.1 | 0.73 | 0.77 |
| ELONGATION | 800 | 800 | 1100 | 700 | 700 | 700 |
| HARDNESS |  |  |  |  |  |  |
| SHORE A | 11/5 | 6/2 | 1/0 | 1/0 | 12/9 | 7/5 |
| SHORE 00 | 65/58 | 62/50 | 50/40 | 60/53 | 65/60 | 60/53 |

As can be seen from the results in the physical properties in Table II, the sealants prepared with the polyol made with CsOH as a catalyst and having a level of unsaturation within the range used in the invention have a positive ratio of modulus of elasticity when strained throughout the range of 100 percent to 300 percent which exceeds 1.2. In contrast, the sealant prepared using a polyol made with the $Zn_3[Co(CN)_6]_2$ catalyst exhibit a modulus of elasticity ratio from 300 percent strain/100 percent strain that is less in unity. Thus, as the sealants are stretched from 100 percent to 300 percent of their original length, their resistance to stress decreased. The sealants prepared with mercuric acetate-treated resin, Sealants 2 and 2', which had an ethylenic unsaturation very similar to that of the inventive examples 1 and 1', displayed extremely low tensile strength and modulus of elasticity ratios from 300 percent/100 percent also near unity. Thus, the working examples above demonstrate that even when a polyol is prepared having a degree of unsaturation almost identical to the inventive polyol prepared with CsOH, or polyols prepared having an extremely low degree of unsaturation using $Zn_3[Co(CN)_6]_2$ catalyst, each of the polyols having similar equivalent weights as shown by the similar hydroxyl values, the sealants made from polyols prepared with cesium catalysts surprisingly exhibit a modulus ration exceeding 1.2.

Also notable is that of the sealant example 1 and 1' prepared with a polyol having reduced unsaturation using a cesium hydroxide catalyst had a lower absolute modulus of elasticity when measured at 100% and at 300%, compared with the sealant examples 3 and 3' prepared with a polyol having a lower unsaturation using a double metal cyanide catalyst. And when one compares sealant examples 1 and 1' with sealant examples 2 and 2' which employed a polyol having an almost identical degree of reduced unsaturation, it is evident that the tensile strengths at break and the absolute moduli of elasticity at 100% and 300% elongation of sealants 2 and 2' are too low to be satisfactory.

The polyols of the invention represent an economical and efficient method for preparing sealants which exhibit a good balance of properties; i.e., good tensile strength, good elongation, low absolute moduli of elasticity at 100 percent and at 300 percent, while also advantageously for some applications exhibiting a ratio of tensile strength at 300 percent/100 percent strain of 1.2 or greater. This has been accomplished without having to reduce the unsaturation of polyols below 0.04 using double metal cyanide catalysts which are difficult to prepare and expensive.

What we claim is:

1. A polyurethane elastomer comprising a reaction product of an organic polyisocyanate with at least one polyether polyol having an equivalent weight of at least 900 and a degree of ethylene unsaturation ranging from 0.04 to 0.07 meq/g of polyol, said at least one polyether polyol having at least 900 equivalent weight of oxypropylene groups, and said elastomer having a ratio of modulus of elasticity at 300% elongation to modulus of elasticity at 100% elongation equal to or greater than 1.4 and comprising a reaction product of propylene oxide and a di-hydroxyl functionality initiator molecule in the presence of between 0.05 mole % and 0.4 mole % of cesium hydroxide catalyst.

2. The polyurethane elastomer of claim 1, having an elongation at break of at least 600 percent and a tensile strength at break of at least 40 psi.

3. The polyurethane elastomer of claim 1, wherein the polyol has a degree of ethylene unsaturation ranging from 0.045 to 0.06 meq/g of polyol.

4. A polyurethane elastomer comprising a reaction product of an organic polyisocyanate with a polyether polyol having an equivalent weight of at least 900 and a degree of ethylene unsaturation of from 0.04 to 0.07 meq/g polyol, said polyol having at least 900 equivalent weight of oxypropylene groups, and said elastomer having a ratio of modulus of elasticity at 300% elongation to modulus of elasticity at 100% elongation equal to or greater than 1.4 and comprising a reaction product of propylene oxide and ethylene oxide and a di-hydroxyl functionality initiator molecule in the presence of between 0.05 mole % and 0.4 mole % of cesium hydroxide catalyst.

5. A polyurethane elastomer as defined in claim 4, having an elongation at break of at least 600 percent and tensile strength at break of at least 40 psi.

6. A polyurethane elastomer as defined in claim 4, wherein said ratio is at least 1.5.

7. A polyurethane elastomer as defined in claim 4, wherein the polyol has a degree of ethylene unsaturation ranging from 0.045 to 0.06 meq/g of polyol.

8. A polyurethane elastomer as defined in claim 1, wherein the di-hydroxyl functionality initiator molecule is selected from the group consisting of ethylene glycol, diethylene glycol, propylene glycol, dipropylene glycol, butanediol, polyoxypropylene polyols having an equivalent weight of 500 or less, and mixtures thereof.

9. A polyurethane elastomer as defined in claim 4, wherein the di-hydroxyl functionality initiator molecule is selected from the group consisting of ethylene glycol, diethylene glycol, propylene glycol, dipropylene glycol, butanediol, polyoxypropylene polyols having an equivalent weight of 500 or less, and mixtures thereof.

* * * * *